US012157499B2

(12) United States Patent
Chien et al.

(10) Patent No.: US 12,157,499 B2
(45) Date of Patent: Dec. 3, 2024

(54) ASSISTANCE METHOD OF SAFE DRIVING AND ELECTRONIC DEVICE

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW); Chieh Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 337 days.

(21) Appl. No.: 17/896,860

(22) Filed: Aug. 26, 2022

(65) Prior Publication Data

US 2023/0415779 A1 Dec. 28, 2023

(30) Foreign Application Priority Data

Jun. 22, 2022 (CN) .......................... 202210714373.X

(51) Int. Cl.
*G06K 9/00* (2022.01)
*B60W 30/09* (2012.01)
(Continued)

(52) U.S. Cl.
CPC ........ *B60W 60/0016* (2020.02); *B60W 30/09* (2013.01); *B60W 50/14* (2013.01);
(Continued)

(58) Field of Classification Search
CPC .. G06T 7/50; G06T 7/70; G06T 17/00; G06T 2207/10024; G06T 2207/10028;
(Continued)

(56) References Cited

U.S. PATENT DOCUMENTS 10,509,947 B1 * 12/2019 Douillard ................ G06T 3/067
10,937,178 B1 * 3/2021 Srinivasan ............. G06T 7/521
(Continued)

FOREIGN PATENT DOCUMENTS

CN 109146943 B * 12/2019 ............. G06F 17/18
EP 4307219 A1 * 1/2024 ............... G06N 3/04
(Continued)

OTHER PUBLICATIONS

Generative adversarial networks for depth map estimation from RGB video, Kin Gwn Lore et al., IEEE, 2018, pp. 1258-1266 (Year: 2018).*

(Continued)

*Primary Examiner* — Jayesh A Patel
(74) *Attorney, Agent, or Firm* — ScienBiziP, P.C.

(57) ABSTRACT

An assistance method of safe driving applied in a vehicle-mounted electronic device obtains RGB images of scene in front of a vehicle, processes the RGB images by a trained depth estimation model, obtains depth images and converts the depth images into three-dimensional (3D) point cloud maps, determines 3D regions of interest therein, and obtains position and size information of objects in the 3D regions of interest. When the position information satisfies a first preset condition and/or the size information satisfies a second preset condition, the presence of obstacles in the 3D regions of interest is determined and controls the vehicle to issue an alarm. When the position information does not satisfy the first preset condition and/or the size information does not satisfy the second preset condition, the 3D regions of interest are determined as obstacle-free, and permitting the vehicle to continue driving.

20 Claims, 3 Drawing Sheets

(51) Int. Cl.
   *B60W 50/14* (2020.01)
   *B60W 60/00* (2020.01)
   *G06T 7/50* (2017.01)
   *G06T 7/62* (2017.01)
   *G06T 7/70* (2017.01)
   *G06T 17/00* (2006.01)

(52) U.S. Cl.
   CPC ................. *G06T 7/50* (2017.01); *G06T 7/62* (2017.01); *G06T 7/70* (2017.01); *G06T 17/00* (2013.01); *B60W 2050/143* (2013.01); *B60W 2554/80* (2020.02); *G06T 2207/10024* (2013.01); *G06T 2207/10028* (2013.01); *G06T 2207/20081* (2013.01); *G06T 2207/20084* (2013.01); *G06T 2207/30261* (2013.01); *G06T 2210/56* (2013.01)

(58) Field of Classification Search
   CPC . G06T 2207/20081; G06T 2207/20084; G06T 2210/56
   See application file for complete search history.

(56) References Cited

U.S. PATENT DOCUMENTS

| | | | | |
|---|---|---|---|---|
| 11,618,438 | B2* | 4/2023 | Srivatsa | G06F 18/2148 701/28 |
| 2014/0330479 | A1* | 11/2014 | Dolgov | G01S 13/865 701/28 |
| 2016/0272207 | A1* | 9/2016 | Dolgov | G08G 1/22 |
| 2019/0180467 | A1* | 6/2019 | Li | G01S 17/93 |
| 2020/0193630 | A1* | 6/2020 | Mousavian | G06N 3/084 |
| 2020/0327690 | A1* | 10/2020 | Cai | G06T 7/73 |
| 2021/0174537 | A1* | 6/2021 | Ye | G06N 3/045 |
| 2021/0394779 | A1* | 12/2021 | Okada | G06V 10/62 |
| 2021/0403023 | A1* | 12/2021 | Zhao | G01S 17/931 |
| 2022/0129685 | A1* | 4/2022 | Gummadi | G06T 7/194 |
| 2023/0033177 | A1* | 2/2023 | Goel | G06V 20/58 |
| 2023/0225576 | A1* | 7/2023 | Wu | G05D 1/243 701/26 |
| 2023/0305573 | A1* | 9/2023 | Xie | A47L 9/2852 |

FOREIGN PATENT DOCUMENTS

| | | | | |
|---|---|---|---|---|
| JP | 2016523751 A | * | 8/2016 | |
| WO | WO-2019202627 A1 | * | 10/2019 | ................ B60T 7/22 |
| WO | WO-2020083024 A1 | * | 4/2020 | ......... G06K 9/00805 |
| WO | WO-2020116206 A1 | * | 6/2020 | ........... G05D 1/0246 |
| WO | WO-2020139477 A1 | * | 7/2020 | ........... B64C 39/024 |
| WO | WO-2022009847 A1 | * | 1/2022 | ................ G06T 7/70 |
| WO | WO-2022042902 A1 | * | 3/2022 | ............. B60Q 1/085 |

OTHER PUBLICATIONS

Single Image Depth Estimation Using Deep Adversarial Training, Praful Hambarde et al., IEEE, 2019, pp. 989-993 (Year: 2019).*
3D Lidar-based static and moving obstacle detection in driving environments: An approach based on voxels and multi-region ground planes, Alireza Asvadi et al., Elsevier, 2016, pp. 299-311 (Year: 2016).*
Identifying and Tracking Pedestrians Based on Sensor Fusion and Motion Stability Predictions, Basam Musleh et al., Sensors, 2010, pp. 8028-8053 (Year: 2010).*

* cited by examiner

ASSISTANCE METHOD OF SAFE DRIVING AND ELECTRONIC DEVICE

This application claims priority to Chinese Patent Application No. 202210714373.X filed on Jun. 22, 2022, in China National Intellectual Property Administration, the contents of which are incorporated by reference herein.

FIELD

The subject matter herein generally relates to an autonomous driving field, in particular, relates to a method for assistance in safe driving and an electronic device.

BACKGROUND

In a field of autonomous driving, when a vehicle is driving, it is necessary to detect whether there are obstacles on the way of the vehicle, and if there are obstacles, action needs to be taken, such as emergency braking or issuing an alarm, to ensure the safety of the vehicle. However, when detecting obstacles, the vehicle cannot accurately know a range of the obstacles, resulting in unsafe driving and poor driving experience for users.

BRIEF DESCRIPTION OF THE DRAWINGS

Implementations of the present disclosure will now be described, by way of embodiment, with reference to the attached figures.

DETAILED DESCRIPTION

Figure 1:
FIG. 1 is an application scene diagram of an assistance method of safe driving.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as. Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an application scene diagram of an assistance method of safe driving. A Three-Dimensional (3D) box in an image as shown in FIG. 1 is a 3D region of interest in which the vehicle is driving in a straight line. Only the objects in the 3D region of interest will be determined as obstacles, and other regions of the image will not be considered.

Figure 2:
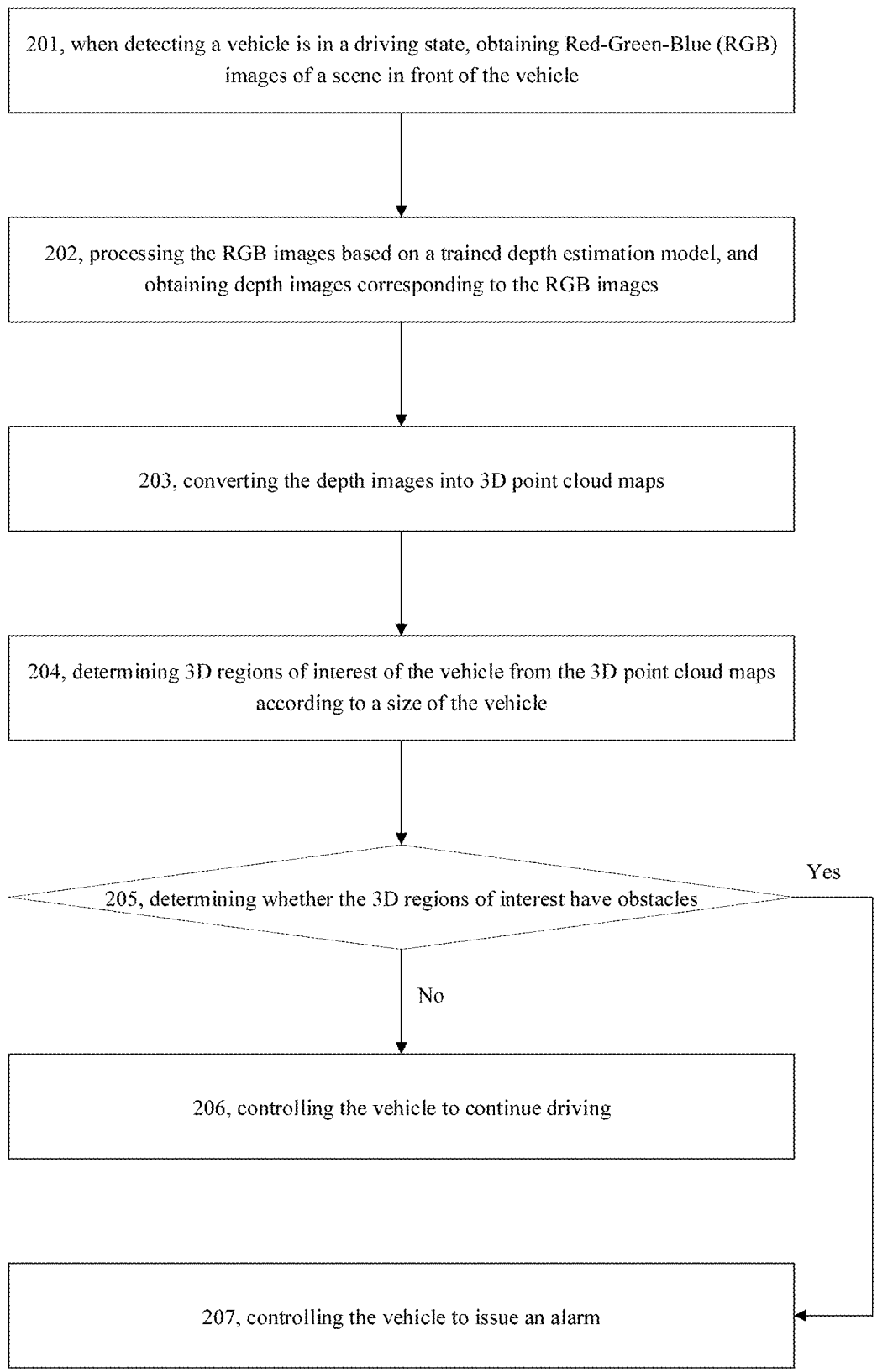
FIG. 2 is a flowchart of one embodiment of the assistance method of safe driving of FIG. 1.

FIG. 2 illustrates the assistance method of safe driving. The method can be applied to a vehicle, and for the vehicle being assisted, the function provided by the method of the present application can be directly integrated on the vehicle, or the method can nm on the vehicle in a form of an in-vehicle system.

In one embodiment, the method is applied in a vehicle-mounted electronic device (referring to FIG. 5). The electronic device connects to the vehicle. The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, when detecting a vehicle is in a driving state, obtaining Red-Green-Blue (RGB) images of a scene in front of the vehicle.

In one embodiment, detecting whether the vehicle is in the driving state includes: detecting whether a tachometer of the vehicle is at "0" speed, or detecting the state of the main electrical system of an electric vehicle. When the pointer of the tachometer points on the "0" speed scale, it is determined that the vehicle is in a non-driving state because the engine is not running; when the pointer of the tachometer shows engine speed other than "0" or that the main electrical system of the electric vehicle is activated, it is determined that the vehicle is in the driving state. In one embodiment, when a pointer of the tachometer on the instrument panel of the vehicle is on the "0" speed scale, the speed of the vehicle is or near 0 km/h.

In one embodiment, obtaining the RGB images of the scene in front of the vehicle includes: obtaining the RGB images by a camera of the vehicle. For example, the RGB images of the scene in front of the vehicle are captured by the camera mounted on the vehicle.

In one embodiment, when detecting that the vehicle is in the driving state, the camera of the vehicle is activated to capture images of the scene in front of the vehicle, and the RGB images are obtained.

At block 202, processing the RGB images based on a trained depth estimation model, and obtaining depth images corresponding to the RGB images.

In one embodiment, the depth estimation model includes a depth estimation convolutional neural network and a pose estimation convolutional neural network. In one embodiment, the depth estimation convolutional neural network includes first input layers, first convolutional layers, and deconvolutional layers. The pose estimation convolutional neural network includes second input layers and second convolutional layers.

In one embodiment, the method includes training the depth estimation model. In one embodiment, training the depth estimation model includes:

obtaining training images; inputting the training images into the depth estimation convolutional neural network, and obtaining the depth images corresponding to the training images; inputting adjacent frame images or adjacent frames of the training images into the pose estimation convolutional neural network, and obtaining the pose information of the camera corresponding to the adjacent frame images; reconstructing the training images based on the depth images, the pose information of the camera, and internal parameters of the camera corresponding to the RGB images, and obtaining reconstructed images; calculating loss values between the training images and the reconstructed images using a preset loss function, adjusting the parameters of the depth estimation model to minimize the loss values, and obtaining the trained depth estimation model. In one embodiment, image frame adjacent frame images are adjacent to the frames of the training images.

In one embodiment, the method further includes: performing data augmentation operations on the training images, and obtaining more training images as training samples. In one embodiment, the data augmentation operations include, but are not limited to, flipping operations, rotating operations, scaling operations, and cropping operations. By performing the data enhancement operations on the training images, the training samples can be effectively expanded, and the depth estimation model can be trained and optimized using a greater number of training images from different scenarios, thereby making the depth estimation model more robust and accurate.

In one embodiment, inputting the training images into the depth estimation convolutional neural network and obtaining the depth images corresponding to the training images includes:

inputting the training images into the depth estimation convolutional neural network by the first input layers of the depth estimation convolutional neural network, and performing convolution operations on the training images by the first convolutional layers, and obtaining a feature map of the training images; inputting the feature map into the deconvolution layers of the depth estimation convolutional neural network, and performing deconvolution operations on the feature map, obtaining a target feature map after the deconvolution operations, and mapping each pixel in the target feature map to a depth value of the each pixel, obtaining the depth images, and outputting the depth images corresponding to the training images.

In one embodiment, the adjacent frame image of one training image can include a previous frame image of the training image or a next frame image of the training image. For example, the training image is captured at time t, the adjacent frame image at time t is the training image at time (t+1) or the training image at time (t−1), wherein time t, time (t+1), time (t−1) corresponds to different frame images. It should be noted that the training images are the RGB images.

In one embodiment, inputting adjacent frame images of the training images into the pose estimation convolutional neural network and obtaining the pose information of the camera corresponding to the adjacent frame images includes: inputting the adjacent frame images of the training images into the pose estimation convolutional neural network by the second input layers of the pose estimation convolutional neural network, and performing the convolution operations on the adjacent frame images by the second convolutional layers of the pose estimation convolutional neural network, and obtaining the pose information of the camera of the adjacent frame images. In one embodiment, the pose information of the camera includes a rotation matrix and a translation matrix, the matrices being represented by six degrees of freedom. In one embodiment, the pixel coordinates in the adjacent frame images of the training images are determined as corresponding by the pixel coordinates in the training image and the pose information of the camera.

In one embodiment, the method includes: calculating the reconstructed images according to a formula $P_{t+1}=K\hat{T}_{t \to t+1}\hat{D}(P_t)K^{-1}P_t$, wherein $P_{t+1}$ represents one reconstructed image, K represents the internal parameters of the camera, $\hat{T}_{t \to t+1}$ represents the pose estimation values (pose information) of the adjacent frame images, $\hat{D}(P_t)$ represents the depth values of the pixel coordinates $P_t$, and $P_t$ represents the pixel coordinates of the training images.

In one embodiment, the method further includes: calculating the loss values between the training images and the reconstructed images with a preset loss function, adjusting the parameters of the depth estimation model to minimize the loss values, and obtaining the trained depth estimation model.

In one embodiment, the preset loss function can be $$L = \frac{1}{M}\sum_t \left(\frac{1}{N}\sum_p |I_t(p) - I_{t+1}(p)|^2\right),$$

wherein $I_t(p)$ represents the pixel coordinates of the training images, $I_{t+1}(p)$ represents the pixel coordinates of the reconstructed images, N represents a number of the pixel coordinates, and M represents a number of the training images.

In one embodiment, the parameters of the depth estimation model refer to the initialization configuration parameters of the depth estimation convolutional neural network and the pose estimation convolutional neural network. For example, the parameters of the depth estimation model include the number of layers of the first convolutional layers and the number of the deconvolutional layers in the depth estimation convolutional neural network, and a size of convolutional kernels of the first convolutional layers and a size of convolutional kernels of the deconvolutional layers. In one embodiment, the parameters of the depth estimation model further include the number of layers of the second convolutional layers in the pose estimation convolutional neural network and the size of a convolutional kernels in the second convolutional layers.

In one embodiment, after the training of the depth estimation model is done and the trained depth estimation model is obtained, the RGB images are input into the trained depth estimation model, and the depth images corresponding to the RGB images are output.

At block 203, converting the depth images into 3D point cloud maps.

In one embodiment, converting the depth images into the 3D point cloud maps includes: converting the depth images into the 3D point cloud maps based on the internal parameters of the camera and the depth images.

In one embodiment, the method includes: converting the depth images to the 3D point cloud maps according to a formula $$D\begin{bmatrix} x_1 \\ y_1 \\ 1 \end{bmatrix} = KU = \begin{bmatrix} f_x & 0 & c_x \\ 0 & f_y & c_y \\ 0 & 0 & 1 \end{bmatrix}\begin{bmatrix} x \\ y \\ z \end{bmatrix},$$

wherein D represents a depth value of one depth image, ($x_1$, $y_1$) represents a pixel coordinate corresponding to the depth value in the depth image, K represents the internal parameters of the camera, and U represents a coordinate (x, y, z) of a point in the 3D point cloud maps.

At block 204, determining 3D regions of interest of the vehicle from the 3D point cloud maps according to a size of the vehicle.

In one embodiment, determining 3D regions of interest of the vehicle from the 3D point cloud maps according to the size of the vehicle includes:
 determining a length, a width and a height of the vehicle;
 determining 3D areas from the 3D point cloud maps as the 3D regions of interest of the vehicle according to the length, the width and the height of the vehicle.

At block 205, determining whether the 3D regions of interest have obstacles.

In one embodiment, determining whether the 3D regions of interest have obstacles includes: obtaining position information and size information of objects in the 3D regions of interest; when the position information satisfies a first preset condition and/or the size information satisfies a second preset condition, determining that the 3D regions of interest have the obstacles and that the objects being imaged are the obstacles; when the position information does not satisfy the first preset condition and/or the size information does not satisfy the second preset condition, determining that the 3D regions of interest are free of obstacles.

In one embodiment, the position information of the objects includes orientation of the objects, and the size information of the objects includes the length, width and height of the objects.

In one embodiment, obtaining the position information and the size information of the objects in the 3D regions of interest includes: obtaining 3D point cloud data of the 3D regions of interest in the 3D point cloud maps; inputting the 3D point cloud data into a deep neural network, and performing convolution operations on the 3D point cloud data the deep by the deep neural network, and outputting an object list. In one embodiment, the object list includes, but is not limited to, the position information of the objects, and the size information of the objects. In one embodiment, the deep neural network includes, but is not limited to, at least any one of AlexNet network, VGGNet network, GoogLeNet network, ResNet network, DenseNet network, SSDNet network, Region-CNN (R CNN) network, You Only Look Once (YOLO) network, Fully Convolutional Networks (FCN), and SegNet network.

In one embodiment, when the orientation of the objects shows that the objects (for example vehicles, person, bicycles) are on the road and/or the length, width and height of the object are greater than preset thresholds, it is determined that the 3D regions of interest have obstacles and that the objects seen are the obstacles.

In one embodiment, when the orientation of the objects shows that the objects (for example culverts, bridge decks, high bridges) are suspended in the air and/or the length, the width and the height of the object are greater than the preset thresholds, it is determined that the 3D regions of interest have no obstacles which affect safety.

In one embodiment, when the 3D regions of interest have no obstacles, block 206 is executed, when the 3D regions of interest have obstacles, block 207 is executed.

At block 206, controlling the vehicle to continue driving.

At block 207, controlling the vehicle to issue an alarm.

In one embodiment, the alarm includes a collision warning or an automatic braking alarm.

The above embodiments are only specific embodiments of the present application, but a protection scope of the present application is not limited to these. For those of ordinary skill in the art, improvements can be made without departing from the inventive concept of the present application, but these all belong to the protective scope of the present application.

Figure 3:
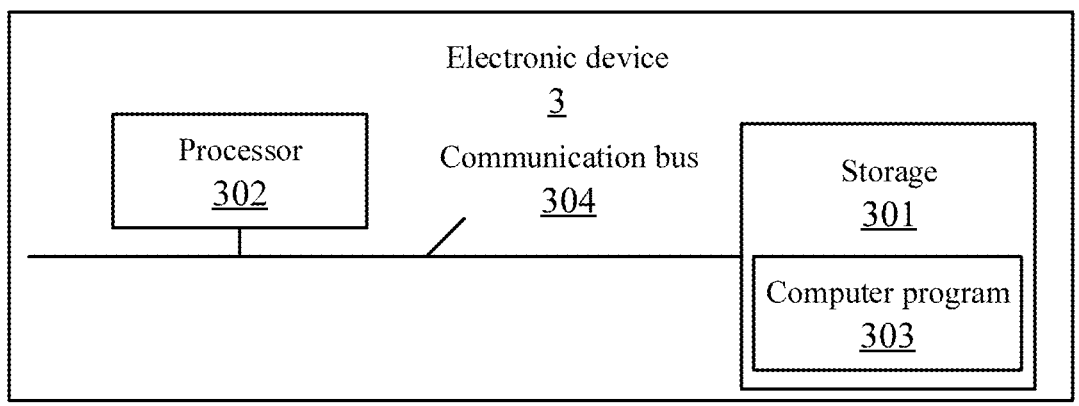
FIG. 3 is a schematic diagram of one embodiment of an electronic device.

FIG. 3 illustrates the electronic device 3. The electronic device 3 includes a storage 301, a processor 302, a computer program 303 stored in the storage 301, and at least one communication bus 304. In one embodiment, electronic device 3 can be an in-vehicle device. The in-vehicle device is provided on a vehicle, and the in-vehicle device may be an in-vehicle computer.

Those skilled in the art can understand that the schematic diagram shown in FIG. 3 is only an example of the electronic device 3, and does not constitute a limitation on the electronic device 3. Other examples may include more or less components than those shown in the drawings, or have different combinations of components or different components, for example, the electronic device 3 may also include input and output devices, network access devices, and the like.

The at least one processor 302 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 302 can be a microprocessor or the at least one processor 502 can also be any conventional processor, etc. The at least one processor 302 is the control center of the electronic device 3, using various interfaces and lines to connect various parts of the entire electronic device 3.

The storage 301 can be used to store the computer program 303, and the at least one processor 302 implements the electronic program by executing the computer program 303 stored in the storage 301 and calling up the data stored in the storage 301. The storage 301 may include a stored program area and a stored data area, wherein the stored program area may store an operating system, an application program required for at least one function (such as a sound playback function, an image playback function, etc.), etc. The storage data area may store data (such as audio data) created according to the use of the electronic device 3, etc. In addition, the storage 301 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/Emits integrated in the electronic device 3 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only and changes may be made in the detail, including in matters of shape, size, and arrangement of the parts within the principles of the present disclosure, up to and including the full extent established by the broad general meaning of the terms used in the claims.

What is claimed is:

1. An assistance method of safe driving comprising:
   when detecting a vehicle is in a driving state, obtaining Red-Green-Blue (RGB) images of a scene in front of the vehicle;
   processing the RGB images based on a trained depth estimation model, and obtaining depth images corresponding to the RGB images;
   converting the depth images into three-dimensional (3D) point cloud maps;
   determining 3D regions of interest of the vehicle from the 3D point cloud maps according to a size of the vehicle;
   obtaining position information and size information of objects in the 3D regions of interest;
   in response that the position information satisfies a first preset condition and/or the size information satisfies a second preset condition, determining that the 3D regions of interest have obstacles and that the objects are the obstacles, and controlling the vehicle to issue an alarm; and
   in response that the position information does not satisfy the first preset condition and/or the size information does not satisfy the second preset condition, determining that the 3D regions of interest have no obstacles, controlling the vehicle to continue driving.

2. The method as claimed in claim 1, further comprising:
   obtaining 3D point cloud data of the 3D regions of interest in the 3D point cloud maps;
   inputting the 3D point cloud data into a deep neural network, and performing convolution operations on the 3D point cloud data the deep by the deep neural network, and outputting the position information and the size information of the objects.

3. The method as claimed in claim 1, further comprising:
   determining a length, a width and a height of the vehicle;
   determining 3D areas from the 3D point cloud maps as the 3D regions of interest of the vehicle according to the length, the width and the height of the vehicle.

4. The method as claimed in claim 1, wherein a depth estimation model comprises a depth estimation convolutional neural network and a pose estimation convolutional neural network.

5. The method as claimed in claim 4, further comprising:
   training the depth estimation model, and obtaining the trained depth estimation model.

6. The method as claimed in claim 5, further comprising:
   obtaining training images;
   inputting the training images into the depth estimation convolutional neural network, and obtaining the depth images corresponding to the training images;
   inputting adjacent frame images of the training images into the pose estimation convolutional neural network, and obtaining a pose information of a camera corresponding to the adjacent frame images;
   reconstructing the training images based on the depth images, the pose information of the camera, and internal parameters of the camera corresponding to the RGB images, and obtaining reconstructed images;
   calculating loss values between the training images and the reconstructed images by using a preset loss function;
   adjusting parameters of the depth estimation model to minimize the loss values, and obtaining the trained depth estimation model.

7. The method as claimed in claim 6, further comprising:
   calculating the reconstructed images according to a formula $P_{t+1} = K\hat{T}_{t \to t+1}\hat{D}(P_t)K^{-1}P_t$, wherein $P_{t+1}$ represents one reconstructed image, K represents the internal parameters of the camera, $\hat{T}_{t \to t+1}$ represents the pose information of the adjacent frame images, $\hat{D}(P_t)$ represents the depth value of a pixel coordinate $P_t$, $P_t$ represents one pixel coordinate of the training images.

8. The method as claimed in claim 6, further comprising:
   performing, data augmentation operations on the training images, and obtaining more training images as training samples, wherein the data augmentation operations comprise one or more of flipping operations, rotating operations, scaling operations, and cropping operations.

9. The method as claimed in claim 1, further comprising:
   converting the depth images into the 3D point cloud maps based on internal parameters of a camera and the depth images.

10. The method as claimed in claim 9, further comprising: converting the depth images into the 3D point cloud maps according to a formula of $$D\begin{bmatrix}x_1\\y_1\\1\end{bmatrix}=KU=\begin{bmatrix}f_x & 0 & c_x\\0 & f_y & c_y\\0 & 0 & 1\end{bmatrix}\begin{bmatrix}x\\y\\z\end{bmatrix}.$$

wherein D represents a depth value of one depth image, ($x_1$, $y_1$) represents a pixel coordinate corresponding to the depth value in the depth image, K represents the internal parameters of the camera, and U represents a coordinate (x, y, z) of a point in the 3D point cloud maps.

11. An electronic device comprising:
a processor; and
a non-transitory storage medium coupled to the processor and configured to store a plurality of instructions, which cause the processor to:
in response that detecting a vehicle is in a driving state, obtain Red-Green-Blue (RGB) images of a scene in front of the vehicle;
process the RGB images based on a trained depth estimation model, and obtain depth images corresponding to the RGB images;
convert the depth images into three-dimensional (3D) point cloud maps;
determine 3D regions of interest of the vehicle from the 3D point cloud maps according to a size of the vehicle;
obtain position information and size information of objects in the 3D regions of interest;
in response that the position information satisfies a first preset condition and/or the size information satisfies a second preset condition, determine that the 3D regions of interest have obstacles and that the objects are the obstacles, and control the vehicle to issue an alarm; and
in response that the position information does not satisfy the first preset condition and/or the size information does not satisfy the second preset condition, determine that the 3D regions of interest have no obstacles, controlling the vehicle to continue driving.

12. The electronic device as claimed in claim 11, wherein the plurality of instructions are further configured to cause the processor to:
obtain 3D point cloud data of the 3D regions of interest in the 3D point cloud maps;
input the 3D point cloud data into a deep neural network, and perform convolution operations on the 3D point cloud data the deep by the deep neural network, and output the position information and the size information of the objects.

13. The electronic device as claimed in claim 11, wherein the plurality of instructions are further configured to cause the processor to:
determine a length, a width and a height of the vehicle;
determine 3D areas from the 3D point cloud maps as the 3D regions of interest of the vehicle according to the length, the width and the height of the vehicle.

14. The electronic device as claimed in claim 11, wherein a depth estimation model comprises a depth estimation convolutional neural network and a pose estimation convolutional neural network.

15. The electronic device as claimed in claim 14, wherein the plurality of instructions are further configured to cause the processor to:
train the depth estimation model, and obtain the trained depth estimation model.

16. The electronic device as claimed in claim 15, wherein the plurality of instructions are further configured to cause the processor to:
obtain training images;
input the training images into the depth estimation convolutional neural network, and obtain the depth images corresponding to the training images;
input adjacent frame images of the training images into the pose estimation convolutional neural network, and obtain a pose information of a camera corresponding to the adjacent frame images;
reconstruct the training images based on the depth images, the pose information of the camera, and internal parameters of the camera corresponding to the RGB images, and obtain reconstructed images;
calculate loss values between the training images and the reconstructed images by using a preset loss function;
adjust parameters of the depth estimation model to minimize the loss values, and obtain the trained depth estimation model.

17. The electronic device as claimed in claim 16, wherein the plurality of instructions are further configured to cause the processor to:
calculate the reconstructed images according to a formula $P_{t+1}=K\hat{T}_{t\rightarrow t+1}\hat{D}(P_t)K^{-1}P_t$, wherein $P_{t+1}$ represents one reconstructed image, K represents the internal parameters of the camera, $\hat{T}_{t\rightarrow t+1}$ represents the pose information of the adjacent frame images, $\hat{D}(P_t)$ represents the depth value of a pixel coordinate $P_t$, $P_t$ represents one pixel coordinate of the training images.

18. The electronic device as claimed in claim 16, wherein the plurality of instructions are further configured to cause the processor to:
perform data augmentation operations on the training images, and obtain more training images as training samples, wherein the data augmentation operations comprise one or more of flipping operations, rotating operations, scaling operations, and cropping operations.

19. The electronic device as claimed in claim 11, wherein the plurality of instructions are further configured to cause the processor to:
convert the depth images into 3D point cloud snaps based on internal parameters of a camera and the depth images.

20. The electronic device as claimed in claim 19, wherein the plurality of instructions are further configured to cause the processor to:
convert the depth images to the 3D point cloud maps according, to a formula of $$D\begin{bmatrix}x_1\\y_1\\1\end{bmatrix}=KU=\begin{bmatrix}f_x & 0 & c_x\\0 & f_y & c_y\\0 & 0 & 1\end{bmatrix}\begin{bmatrix}x\\y\\z\end{bmatrix},$$

wherein D represents a depth value of one depth image, ($x_1$, $y_1$) represents a pixel coordinate corresponding to the depth value in the depth image, K represents the internal parameters of the camera, and U represents a coordinate (x, y, z) of a point in the 3D point cloud maps.

* * * * *